UNITED STATES PATENT OFFICE.

CHARLES BRENNER, OF QUINCY, ILLINOIS.

IMPROVEMENT IN PAVING-STONE.

Specification forming part of Letters Patent No. 208,364, dated September 24, 1878; application filed May 22, 1878.

*To all whom it may concern:*

Be it known that I, CHARLES BRENNER, of Quincy, in the county of Adams and State of Illinois, have invented a new and useful Improvement in Paving-Stone, of which the following is a specification:

The invention relates to an improved composition for the manufacture of paving-stone and analogous purposes, as hereinafter more particularly described.

The ingredients employed are: one part blue hard soap-stone, pulverized; one part genuine fire-proof clay, pulverized, (consisting of dry silica 30.1, alumina 17.7, carbonate of lime 1, oxide of iron 1, water 10;) one part light-burning soap-stone, pulverized; one part extract of cinders from iron-furnaces, crushed and sifted.

The light-burning soap-stone and the genuine fire-proof clay are melted together by intense heat, and then thoroughly mixed with the blue hard soap-stone and the cinders. This forms a homogeneous plastic mass, which is placed in molds of any suitable dimensions, and then submitted to about two tons' pressure in a hydraulic or other press, after which the molded forms are removed from the molds and baked in an oven or furnace heated to a degree sufficient to smelt gold or silver.

Thus is constructed a paving-tile which is inexpensive and exceedingly durable.

In applying these tiles to the purposes of ordinary paving-brick, they should be set in sand and cement in the manner heretofore practiced.

The cinders keep the mass from shrinking, while the blue hard soap-stone gives it a body.

What I claim as my invention, and desire to secure by Letters Patent, is—

As an improved manufacture, a paving-tile or analogous structure formed of blue hard soap-stone, genuine fire-proof clay, light-burning soap-stone, and extract of cinders or analogous materials, in suitable proportions, substantially as specified.

In testimony that I claim the foregoing improvement in paving-stone, as above described, I have hereunto set my hand this 17th day of May, 1878.

CHARLES BRENNER.

Witnesses:
  H. K. RODOLF,
  EDWARD QUAAS.